US006027009A

United States Patent [19]
Shinchi

[11] Patent Number: 6,027,009

[45] Date of Patent: Feb. 22, 2000

[54] CONNECTION STRUCTURE OF WIRE AND TERMINAL, CONNECTING METHOD THEREFOR AND A TERMINAL

[75] Inventor: Akira Shinchi, Shizuoka-ken, Japan

[73] Assignee: Yazaki Corporation, Tokyo, Japan

[21] Appl. No.: 09/086,563

[22] Filed: May 29, 1998

[30] Foreign Application Priority Data

May 30, 1997 [JP] Japan .................................... 9-142491

[51] Int. Cl.[7] ...................................................... B23K 31/02

[52] U.S. Cl. ..................... 228/111.5; 228/212; 228/235.1

[58] Field of Search .................................. 228/110.1, 111, 228/111.5, 265, 212, 235.1, 1.1

[56] References Cited

U.S. PATENT DOCUMENTS 4,589,584 5/1986 Christiansen et al. ............... 228/111.5
5,584,122 12/1996 Kato et al. ................................ 29/872

FOREIGN PATENT DOCUMENTS 7-320842 12/1995 Japan .

*Primary Examiner*—Samuel M. Heinrich
*Attorney, Agent, or Firm*—Finnegan, Henderson, Farabow, Garrett & Dunner, L.L.P.

[57] ABSTRACT

A soldering material (28) is joined to a surface (13*a*) of a terminal (13). The terminal (13) is incorporated in a groove (18) of a connector housing (11) so that a covered wire (19) is made into contact with the terminal (13). A cover (12) is mounted so as to insert protrusions (22) into the grooves (18). By carrying out ultrasonic vibration while applying a pressure by a ultrasonic horn, a covering portion of the covered wire is melted and removed. The soldering material (28) is melted by heat generated when the covering portion is melted so that the soldering material (28) is made into contact with the cores thereby the cores and terminal (13) being connected with each other through the soldering material (28). As a result, the soldering material (28) makes a firm contact with the cores.

4 Claims, 14 Drawing Sheets

CONNECTION STRUCTURE OF WIRE AND TERMINAL, CONNECTING METHOD THEREFOR AND A TERMINAL

BACKGROUND OF THE INVENTION

1. Field of the Invention

This invention relates to a connection structure for connecting a wire and a terminal by ultrasonic vibration and by ultrasonic wave oscillation, a connection method thereof and a terminal for use therein.

2. Description of the Related Arts

FIGS. 1 to 5 show a conventional connection structure by ultrasonic vibration described in Japanese Patent Application Laid Open No.Hei7-320842.

In connection structures shown in FIGS. 1 to 5, a pair of resin chips 2 in which soldering material 1 such as solder is filled or installed are used, and covered wires 5 the cores 3 of which are covered with each covering portion 4 intersect each other and are joined with each other. That is, as shown in FIG. 1, the intersecting portion of the covered wires 5 is pinched with a pair of the resin chips 2 from up and down. A ultrasonic horn (not shown) is fit to the resin chip 2 so as to apply a pressure to the intersecting portion. With this condition, ultrasonic waves are applied from the ultrasonic horn, so that as shown in FIG. 2, the resin chips 2 are melted and fused together. The covering portion 4 of the covered wire 5 is melted and removed so as to expose the cores 3. At the same time, the soldering material 1 is melted by heat generated when the chips 2 are melted, so that the exposed cores 3 are soldered with each other.

In connection structures shown in FIGS. 3, 4, resin chips 6 in which the soldering material 1 is buried such that its top is exposed are used. The resin chips 6 are contacted with the intersecting portion of the covered wires 5 such that the soldering material 1 is in contact therewith. By melting the resin chips 6 and then melting and removing the covering portion 4, the intersecting cores 3 are soldered with each other by the soldering material 1.

In a connection structure shown in FIG. 5, a terminal metal 1 is connected to a covered wire 5. According to this structure, one resin chip 8 having the soldering material 1 is placed on an anvil 9 and then the terminal metal 7 and covered wire 5 are placed on the anvil 9 such that they are made in contact with each other. Then, the other resin chip 8 is contacted with the covered wire 5. By carrying out ultrasonic vibration by the ultrasonic horn 10, the covering portion 4 is melted and removed. At the same time, the resin chip 8 is melted and the soldering material 1 is melted so as to connect the cores 3 to the terminal metal 7.

However, because the resin of the covering portion 4 and resin chip 2 exist between the intersecting cores 3 in the connection structure shown in FIGS. 1, 2, even if the soldering material 1 is melted at the same time as the melting of the resin, the melted soldering material is obstructed by the resin, so that it cannot make an excellent contact with the cores thereby the connecting reliability being reduced.

In the connection structures shown in FIGS. 3 to 5, the melted soldering material 1 is expelled outside of the connecting portion together with a melted portion of the covering portion 4 of the covered wire 5, so that the reliability of the connection is also reduced.

SUMMARY OF THE INVENTION

The present invention has been achieved with such points in mind.

It therefore is an object of the present invention to provide a connecting structure for a wire and a terminal allowing the soldering material to make a secure contact with the cores so as to improve reliability of connection, a connection method and a terminal for use therein.

To achieve the object, according to a first aspect of the present invention, there is provided a connection structure for a wire and a terminal, comprising: a first resin member; a second resin member fitting to the first resin member; a wire including cores covered with a covering portion made of resin; and a terminal provided with a conductive soldering material; wherein the covering portion of the wire is melted and removed by ultrasonic vibration and by ultrasonic wave oscillation so as to connect the cores to the terminal through the conductive soldering material.

In this structure, by pinching the terminal and covered wires with the resin members, the soldering material of the terminal comes into contact with the covered wire. If the covering portion is melted and removed by ultrasonic vibration with this condition, the soldering material comes into contact with the cores inside the covering portion and the soldering material is softened or melted. As a result, the cores bite into the soldering material so that the cores and terminal are conductively connected to each other through the soldering material. Therefore, because the soldering material makes a firm contact with the cores, a reliability of connection is improved.

According to a second aspect of the invention, there is provided a connection method for a wire and a terminal comprising the steps of: incorporating a terminal in a groove formed on a first resin member, the terminal provided with a conductive soldering material at the surface thereof; putting a wire which includes cores covered with a covering portion made of resin on the terminal; inserting a protrusion formed on a second resin member into the groove in such a manner that the protrusion and the groove pinch the terminal and the wire; by performing ultrasonic vibration and ultrasonic wave oscillation while applying a pressure to the covered wire and the terminal, melting and removing the covering portion; and making the cores into contact with the soldering material being at least softening state.

By incorporating the terminal in the groove of one resin part such that the terminal is in contact with the covered wire, the soldering material of the terminal is made into contact with the covered wire. Then, by inserting the protrusion of the other resin part and performing ultrasonic vibration while applying a pressure, the covering portion of the covered wire is melted and removed, so that the cores inside the covering portion make contact with the soldering material. Further, because the soldering material is softened or melted thereby making contact with the cores, the cores and terminal are conductively connected to each other through the soldering material. Therefore, it is possible to make the soldering material and cores in a firm contact with each other.

According to a third aspect of the present invention, as it depends from the second aspect, the soldering material is softened by heat generated when the covering portion is melted and removed by the ultrasonic vibration.

Because the soldering material is softened by heat generated for melting and removing the covering portion, it is not necessary to carry out ultrasonic vibration independently for softening the soldering material. Thus, the melting work by the ultrasonic vibration can be simplified.

According to a fourth aspect of the present invention, there is provided a connection method for a wire and a terminal comprising the steps of: incorporating a terminal in a groove formed on a first resin member, the terminal provided with a conductive soldering material at the surface thereof; putting a wire which includes cores covered with a covering portion made of resin on the terminal; inserting an ultrasonic horn into the groove in such a manner that the ultrasonic horn and the groove pinch the terminal and the wire; by performing ultrasonic vibration from the ultrasonic horn while applying a pressure to the covered wire and the terminal so as to melt and remove the covering portion; making the cores into contact with the soldering material being at least softening state; and inserting a protrusion formed on a second resin member into the groove in such a manner that the protrusion and the groove pinch the terminal and the wire.

In the construction of the fourth aspect, the ultrasonic horn contact directly to the covered wire, and directly applying and performing the ultrasonic vibration to the covering portion. Therefore, damping of the ultrasonic vibration is minimized so that the ultrasonic vibration is effectively transmitted to the covered wire. In this connection, the energy for the ultrasonic vibration can be saved.

Furthermore, the second resin member as a cover is not melted to be welded to the first resin member by the ultrasonic vibration. The first and the second resin members are able to be used again after the first and the second resin members are disassembled for maintenance.

According to a fifth aspect of the present invention, there is provided a terminal comprising: a conductive soldering material, wherein the terminal is to be contact to cores of a wire which includes a covering portion made of resin covering the cores when the covering portion is melted and removed by ultrasonic vibration and by ultrasonic wave oscillation; and the conductive soldering material is located at the contact portion on the terminal where the cored and the terminal are to be jointed.

By providing the terminal with the soldering material, the soldering material makes contact with the covered wire. Thus, it is possible to make the terminal into a firm contact with the cores in the covered wire through the soldering material.

According to a sixth aspect of the present invention, as it depends from the fifth aspect, the terminal has an upright wall; and the upright wall is formed with an aperture where the melted covering portion of the wire is relieved.

In the construction of the sixth aspect, the terminal is stabilized by the upright wall in the groove, thereby assembling working is facilitated. Furthermore, according to the aperture, the melted covering portion of the wire is easily relieved, thereby facilitating to remove the melted covering portion from the covered wire.

BRIEF DESCRIPTION OF THE ACCOMPANYING DRAWINGS

The above and further objects and novel features of the present invention will more fully appear from the following detailed description when the same is read in conjunction with the accompanying drawings, in which.

DETAILED DESCRIPTION OF THE PREFERRED EMBODIMENTS

Figure 1:
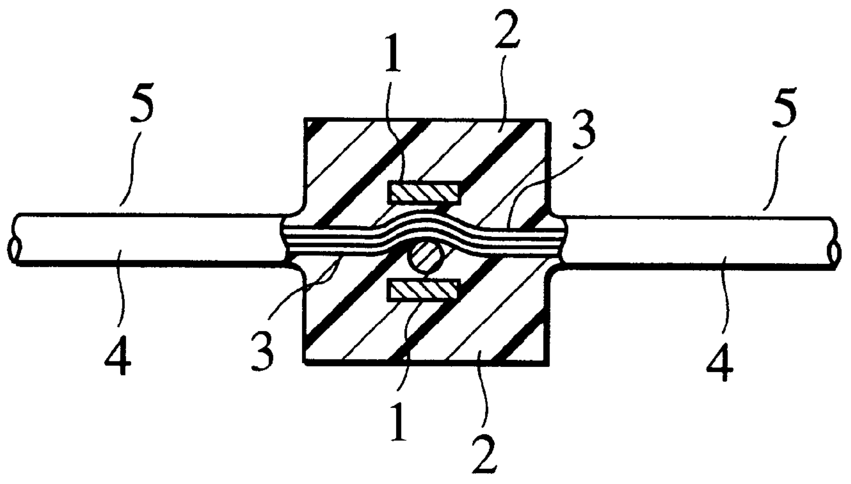
FIG.1 PRIOR ART
FIG. 1 is a sectional view of a conventional structure.
Figure 2:
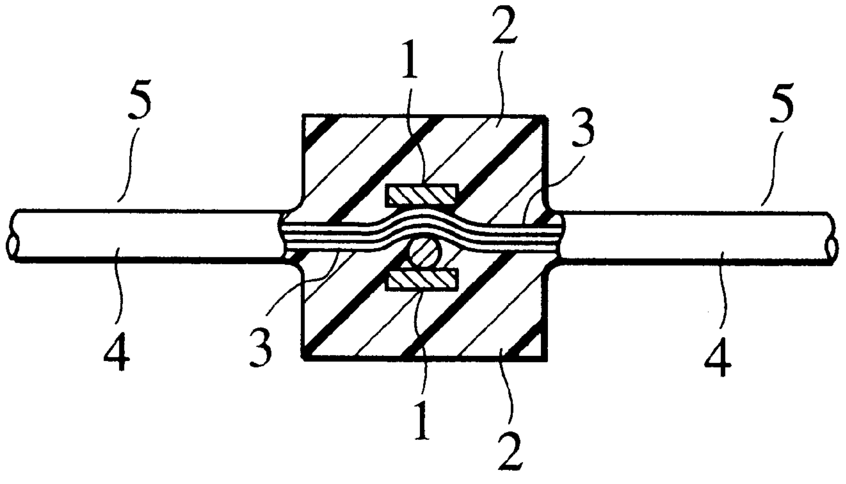
FIG.2 PRIOR ART
FIG. 2 is a sectional view showing a connection with the structure of FIG. 1.
Figure 3:
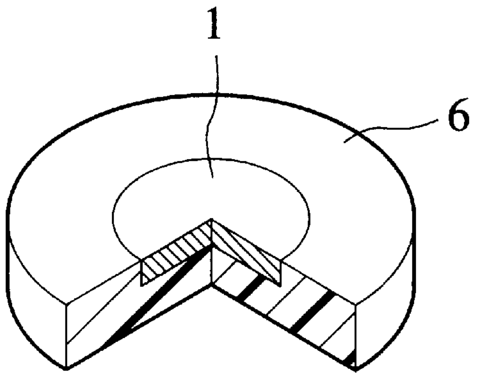
FIG.3 PRIOR ART
FIG. 3 is a partly broken perspective view of a resin chip for use in another conventional connection structure.
Figure 4:
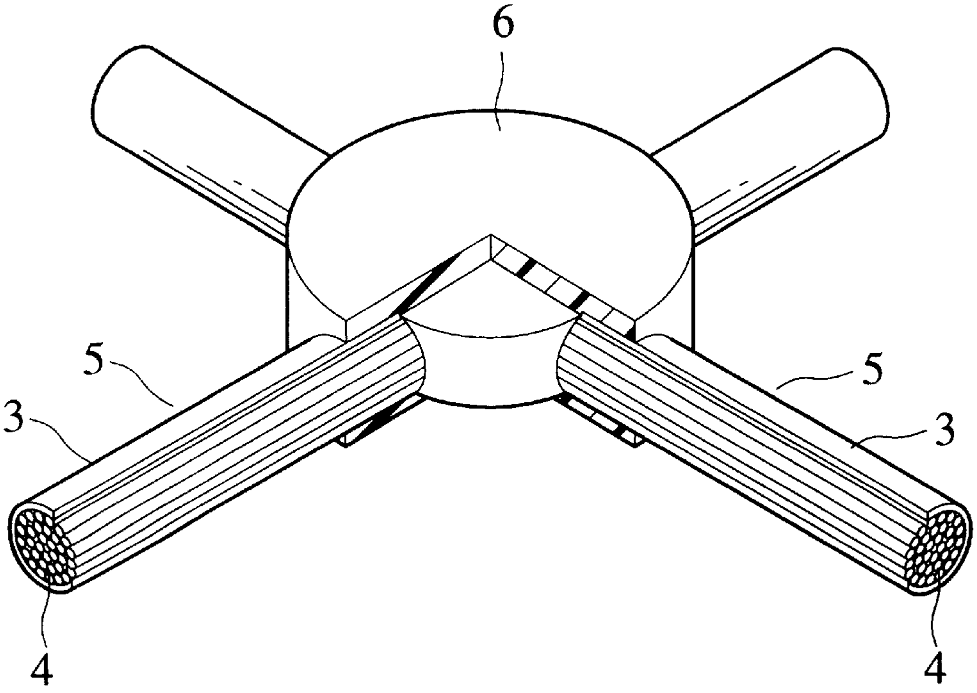
FIG.4 PRIOR ART
FIG. 4 is a partly broken perspective view of still another connection structure.
Figure 5:
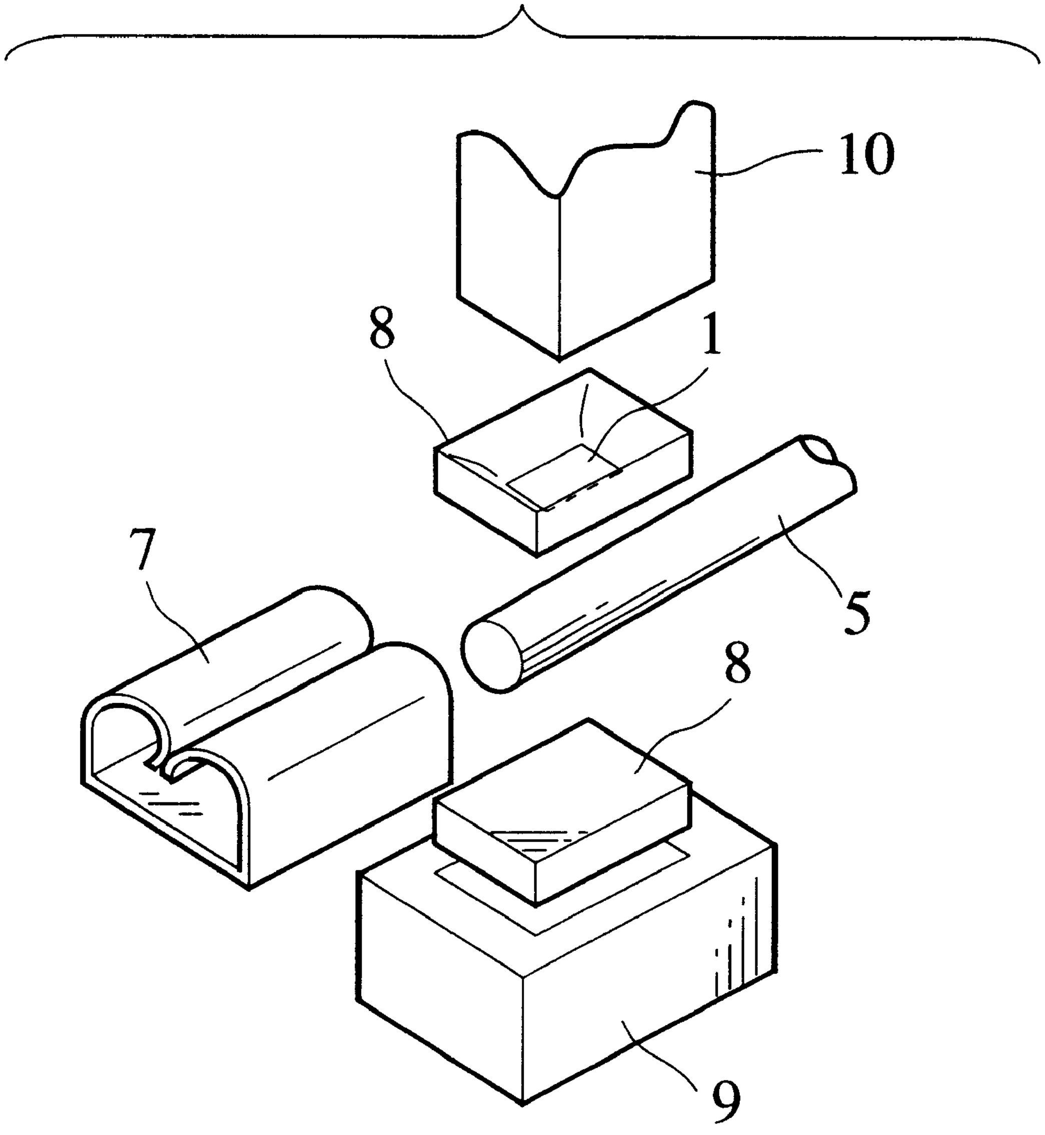
FIG.5 PRIOR ART
FIG. 5 is an exploded perspective view of still another connection structure.

The contents of U.S. Pat. No. 5,584,122 are incorporated herein by reference.

There will be detailed below the preferred embodiments of the present invention with reference to the accompanying drawings. Like members are designated by like reference characters.

Figure 6:
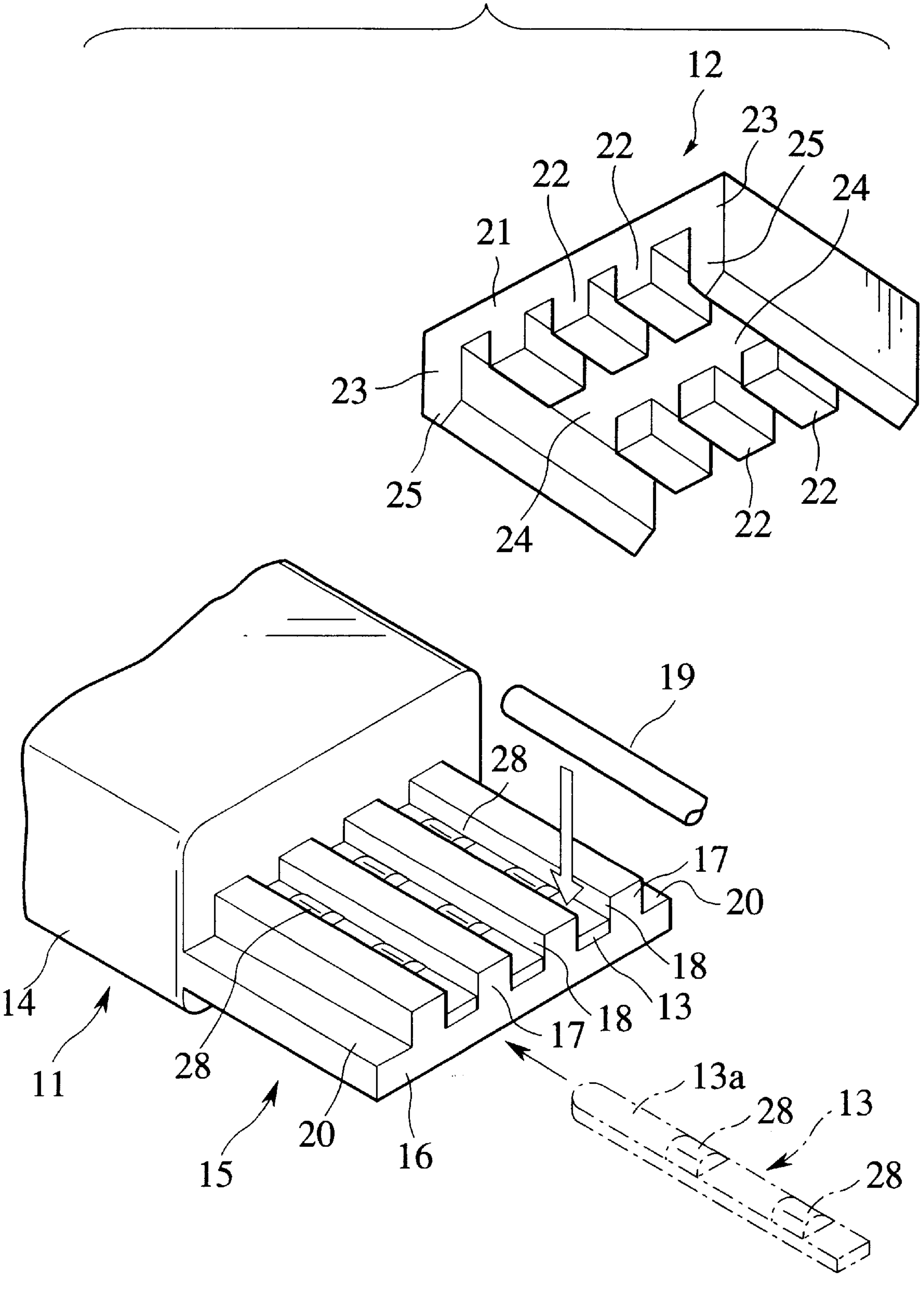
FIG. 6 is an exploded perspective view of an embodiment of the present invention.
Figure 7:
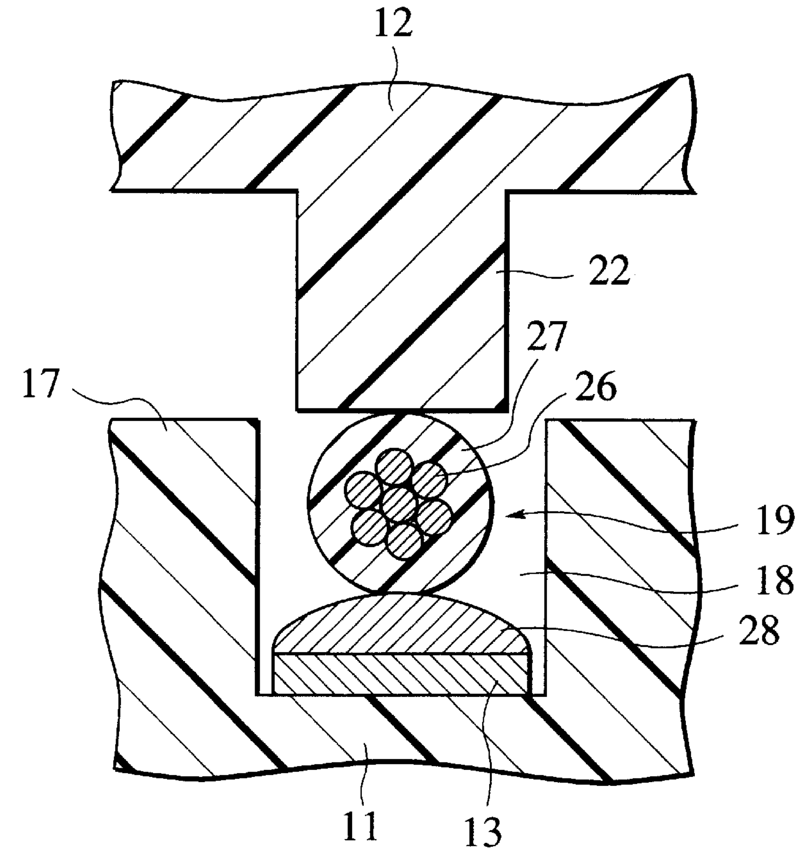
FIG. 7 is a sectional view showing a state in which the terminal and covered wire are made into contact with each other.
Figure 8:
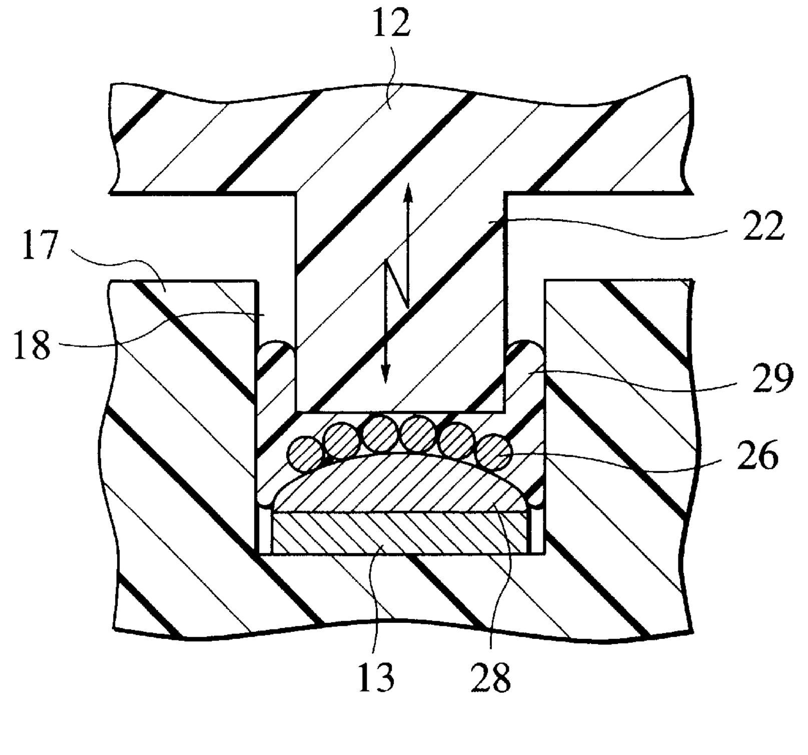
FIG. 8 is a sectional view showing a state in which the covering portion is melted and removed by ultrasonic vibration.
Figure 9:
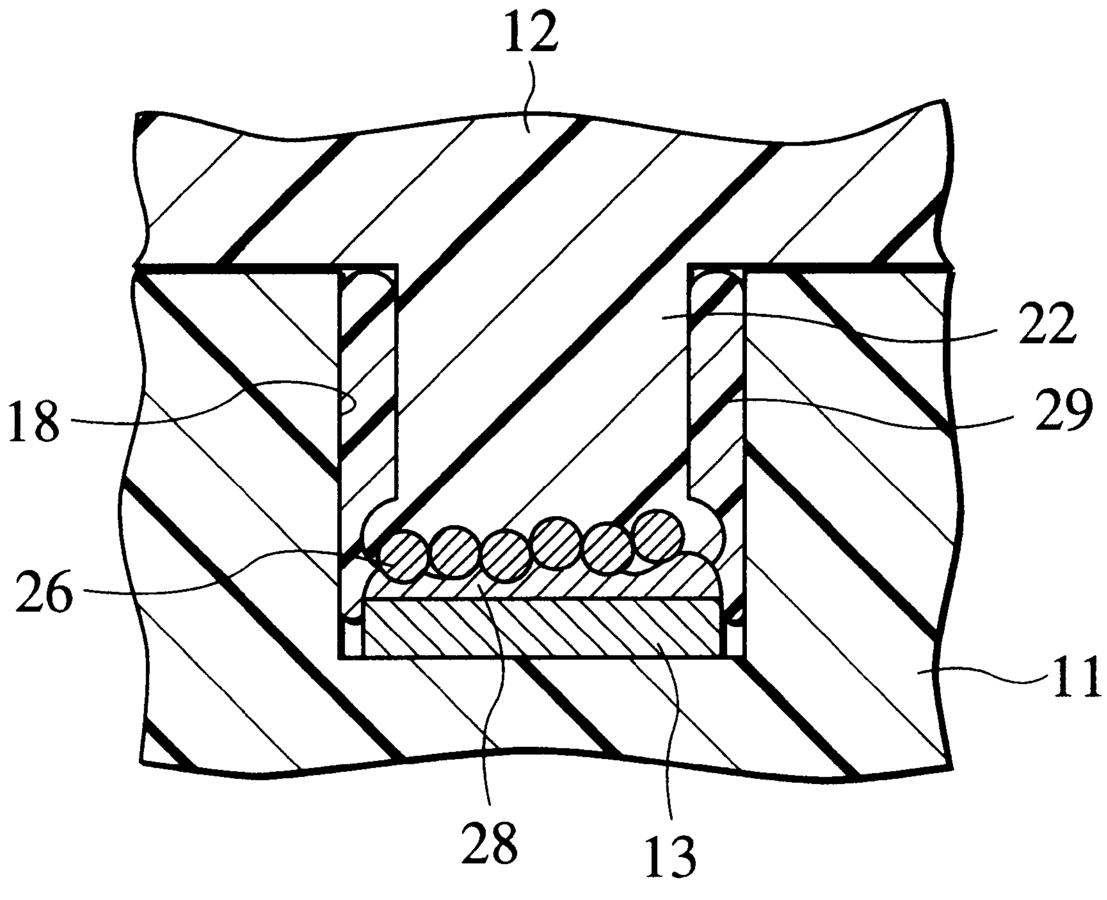
FIG. 9 is a sectional view showing a state in which the cores and terminal are connected to each other through soldering material.

FIG. 6 is a disassembly perspective view of an embodiment of the present invention. FIGS. 7 to 9 are sectional views showing steps of connection. As shown in FIG. 6, this embodiment includes a first resin member 11, second resin member 12 and terminals 13 made of conductive metal.

In this embodiment, the present invention is applied to a connector. The first resin member 11 acts as a connector housing and the second resin member 12 acts as a cover.

The first resin member 11 contains a hood portion 14 which is to be connected to a mating connector (not shown) through engagement and a wire introducing portion 15 which is provided on one side of the hood portion 14 integrally therewith.

In the wire introducing portion 15, a bottom wall portion 16 extends from the hood portion 14 and a plurality of partition wall portions 17 are protruded in parallel to each other from a top face of the bottom wall portion 16 so that portions surrounded by the partition wall portions act as a groove 18. The groove 18 provides a rectangular section the top of which is open. The terminal 13 is incorporated in each groove 18 so as to achieve connection with a covered wire 19. A portion outside of the partition wall portion 17, of the bottom wall portion 16 acts as a welding portion 20 on which the cover 12 is to be welded.

The cover 12 comprises a closed plate portion 21 for covering the wire introducing portion 15, a plurality of protrusions 22 formed on a face of this closed plate portion 21 opposing the wire introducing portion 15 and side wall portions 23 provided outside of the protrusions 22.

The protrusions 22 have the same rectangular sections as the grooves 18 and are formed on positions opposing the grooves 18. The protrusions 22 are formed with a slightly smaller dimension than the grooves 18 and inserted into the corresponding grooves 18 when the cover 12 is placed over the wire introducing portion 15. By this insertion, the protrusions 22 make a contact with the covered wire 19 introduced in the grooves 18 so as to press the covered wire 19 against the terminal 13.

According to the present embodiment, each protrusion 22 has a cutout portion 24 at its middle portion so that it is discontinuous. Thus, the protrusions 22 do not contact the entire length of the covered wire 19 in the groove 18 so that the cutout portion 24 is not in contact with the covered wire 19. By forming the cutout portion 24 which is never in contact with the covered wire 19, it is possible to let the covering portion melted by ultrasonic vibration or ultrasonic wave oscillation go into the cutout portion 24.

The side wall portions 23 of the cover 12 oppose the welding portions 20 of the wire introducing portion 15, so that when the cover 12 is placed on the wire introducing portion 15, the side wall portions 23 make contact with the welding portions 20. A tip of this side wall portion 23 is a sharp edged welding portion 25 and welded to the welding portion 20 of the wire introducing portion 15 by ultrasonic vibration.

The connector housing 11 and cover 12 are made of acrylic resin, ABS (acrylonitrile-butadiene-styrene copolymer) resin, PC (polycarbonate) resin, PVC (polyvinyl chloride) resin, polyethylene resin, olefin base resin such as polypropylene, PEI (polyetherimide) base resin, PBT (polyethylene terephtalate) base resin, ABS/vinyl chloride alloy, acrylic/vinyl chloride alloy, polyester elastomer or block copolymer of PBT and poly ether.

The covered wire 19 is formed by covering a plurality of cores 26 with a covering portion 27 made of insulating resin such as vinyl chloride or the like as shown in FIG. 7.

The terminal 13 is formed in the form of a flat plate and inserted in the groove 18 in the connector housing 11. The terminal 13 is inserted through the hood portion 14 of the connector housing 11 so that an insertion end thereof makes contact with a terminal of a mating connector engaged in the hood portion 14 thereby attaining an electrical connection. This terminal 13 is conductively connected to the cores 26 of the covered wire 19.

On a contacting portion of the terminal 13 with the covered wire 19 or surface 13*a* is placed conductive soldering material 28. The soldering material 28 is made of soft solder or low melting solder, and melted over the surface 13*a* of the terminal 13 before connected to the cores 26. This connection can be carried out easily by dropping the melted soldering material 28 on the surface 13*a* of the terminal 13 or coating the surface 13*a* therewith and then cooling.

Although joining by the soldering material 28 is permitted to be carried out over the entire area of the surface 13*a* of the terminal 13, by carrying out the joining at only portions opposing the protrusions 22 of the cover 12 as shown in FIG. 6, the amount of the soldering material 28 can be saved so that it is economical and the joining work is simplified.

Next, the assembly work of the present embodiment will be described.

As shown in FIG. 6, the terminal 13 on which the soldering material 28 is preliminarily placed is introduced in each of the grooves 18 of the connector housing 11 so that the end portion of the terminal 13 is inserted through the hood portion 14. Then, the covered wire 19 is placed on each of the terminals 13 and the cover 12 is mounted over the wire introducing portion 15. At this time, as shown in FIG. 7, each of the protrusions 22 is aligned with the groove 18 and inserted into the groove 18, so that the covered wire 19 and terminal 13 are pinched with the connector housing 11 and cover 12.

With this condition, a ultrasonic horn (not shown) is fit to the cover 12 and ultrasonic vibration or ultrasonic wave oscillation is carried out while applying a pressure. This applied ultrasonic waves vibrate in a longitudinal direction which is the same direction as a pressure applying direction of the ultrasonic horn. This ultrasonic waves are transmitted to the covered wire through the protrusion 22. As a result, the covering portion 27 of the covered wire 19 is heated and the covering portion 27 is melted and removed as shown in FIG. 8.

By melting and removing the covering portion 27, the cores 26 make contact with the soldering material 28 on the terminal 13. Further, because a pressure is applied by the ultrasonic horn, the protrusion 22 is lowered and the protrusion 22 itself begins to melt.

The soldering material 28 absorbs heat produced when the covering portion 27 is melted and heat produced when the protrusions 22 are melted. By this absorption, the soldering material 28 is softened or melted. Because of this softening or melting of the soldering material 28, the cores 26 bite into the soldering material 28 so that as shown in FIG. 9, the cores 26 and soldering material 28 contact with each other through a large contacting area. Due to this contacting between the soldering material 28 and cores 26, the cores 26 are conductively connected to the terminal 13.

In this connection structure, the melted resin does not turn to an obstacle to the contact between the soldering material 28 and cores 26 and further the soldering material 28 is never expelled outside. As a result, the soldering material 28 and cores 26 make a firm contact with each other so that a highly reliable connection is achieved. Further because the cores 26 bite into the soldering material 28 so as to attain the firm contact and the melted soldering material 28 adhere to the surrounding of the cores 26, the contacting area between the soldering material 28 and cores 26 is enlarged, so that the contact resistance can be reduced, thereby achieving a stable connection between the cores 26 and terminal 13.

The covering portion 27 melted by ultrasonic vibration is filled between the groove 18 and protrusion 22 as indicated by reference numeral 29 of FIGS. 7, 8. This melted portion 29 presses the terminal 13 and cores 26 such that they are fixed. Thus, there is no possibility that the terminal 13 is separated from the cores 26 thereby keeping a reliable connection.

Connection of the connector housing 11 and cover 12 is carried out by making the respective welding portions 20, 25 into contact with each other and then melting them while applying a pressure by ultrasonic vibration. In this case, because the melted portion 29 of the covering portion 27 is filled between the internal wall of the groove 18 and the external wall of the protrusion 22 so that this filled melted portion 29 acts to join the connector housing 11 with the cover 12, its joining force is intensified. Therefore, the protrusion 22 can firmly hold the cores 26 against the terminal 13, so that a highly reliable connection is attained.

Referring now to FIGS. 10 to 18, a second embodiment will be explained hereinafter. The embodiment includes a connection structure or a connection method for a wire and a terminal where an ultrasonic horn directly contacts to the wire to apply or to perform the ultrasonic vibration.

Figure 10:
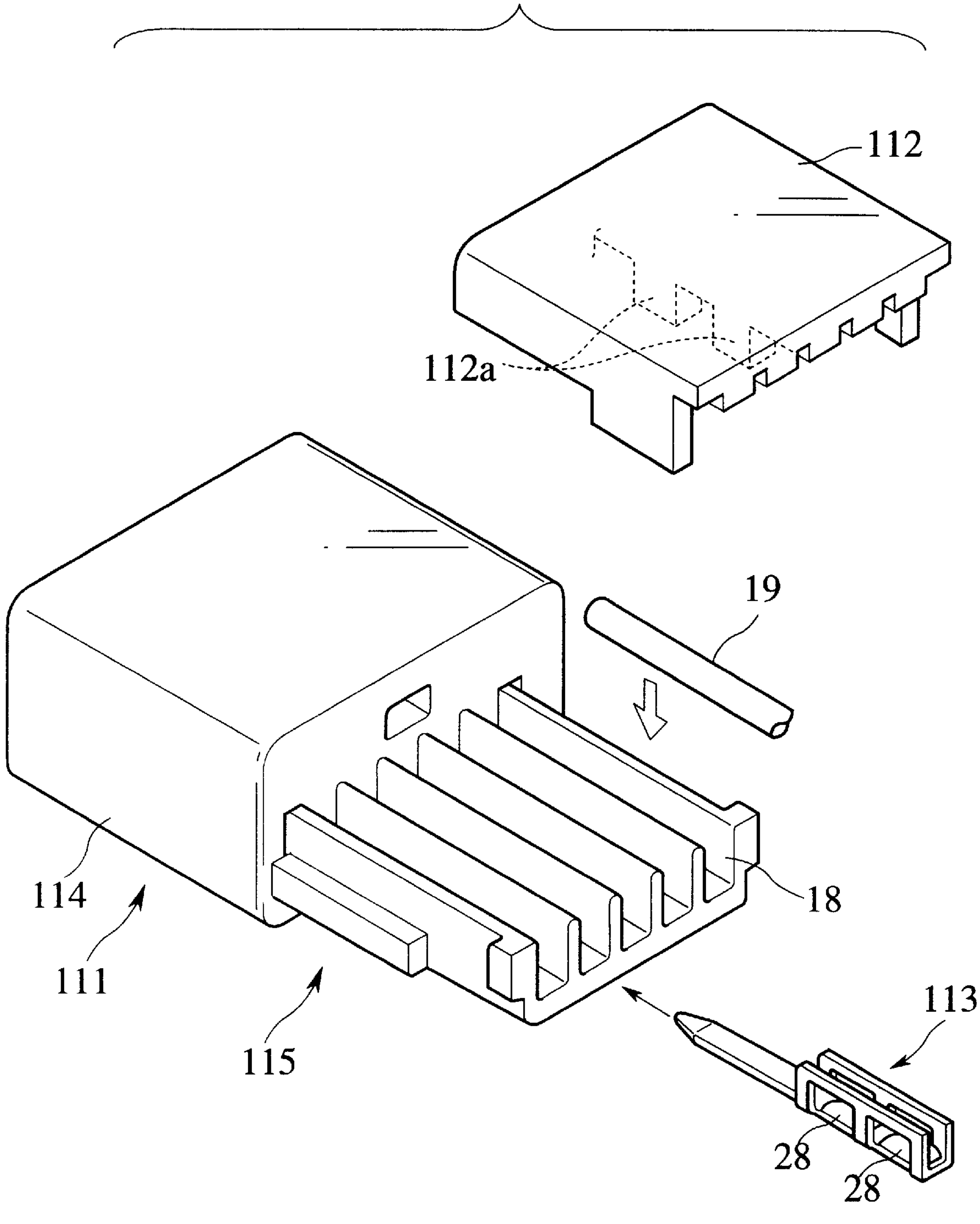
FIG. 10 is an exploded perspective view of the connection structure according to a second embodiment of the present invention.
Figure 11:
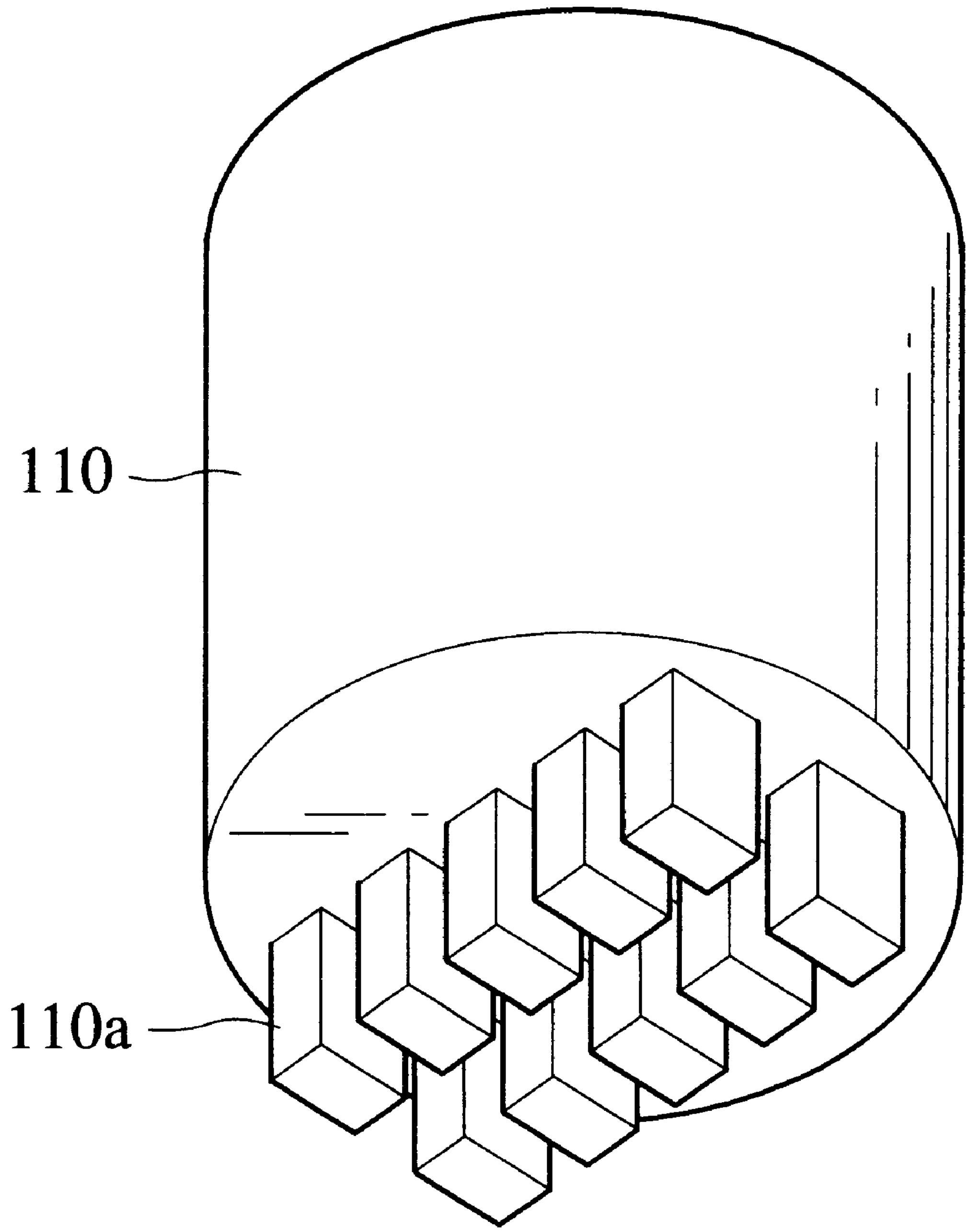
FIG. 11 is a perspective view of the ultrasonic horn according to a second embodiment of the present invention.

FIG. 10 shows an exploded perspective view of the connection structure of the embodiment. FIG. 11 shows a perspective view of the ultrasonic horn 110 to be contact to the covered wires 19. The ultrasonic horn 110 has a plurality of protrusions 110*a*.

Figure 15:
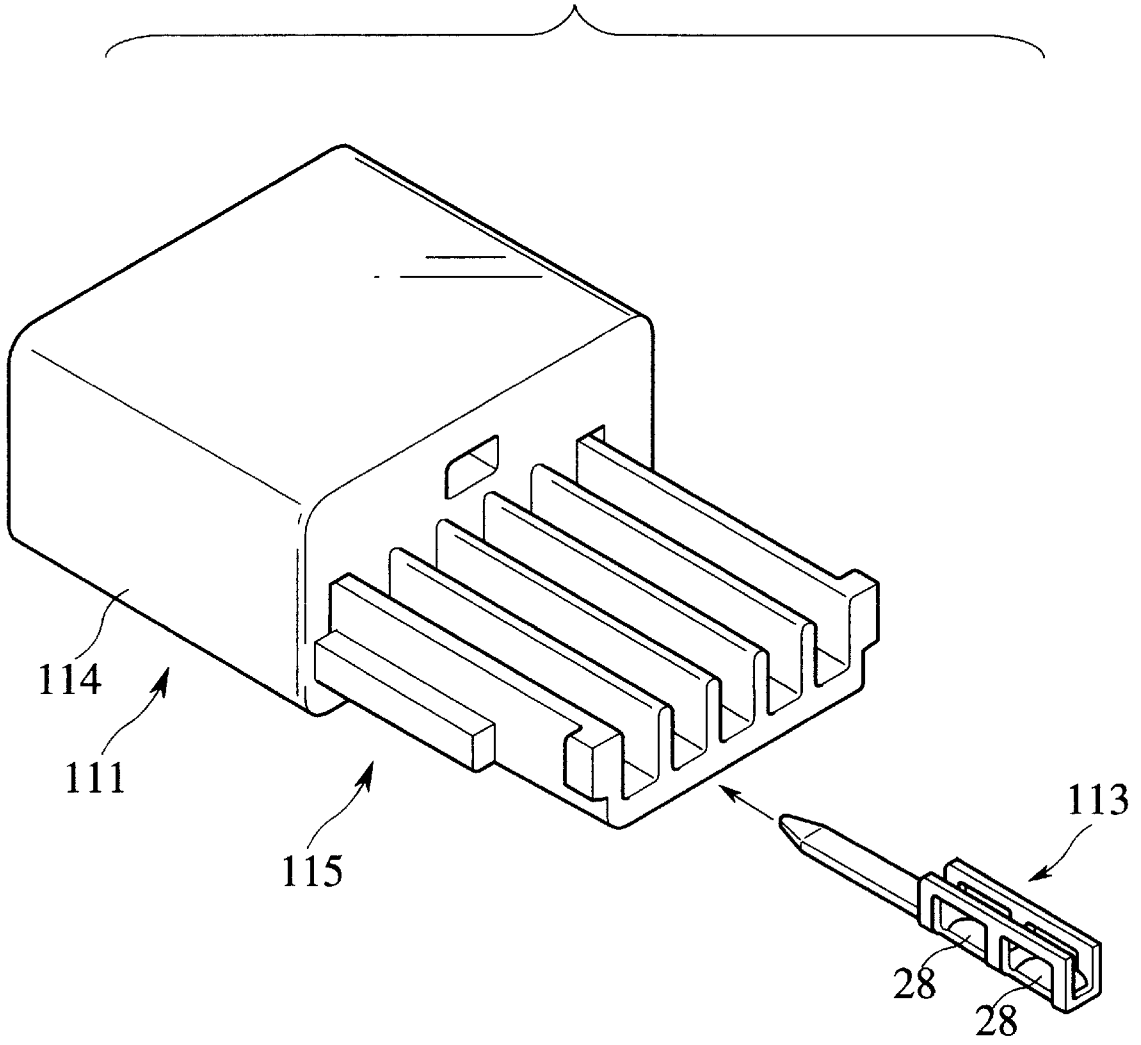
FIG. 15 is a perspective view which shows a first stage of the connection method of the second embodiment of the present invention.

To connect the covered wires 19 with a terminal 113, first of all, the terminal 113 is introduced or incorporated in the groove 18 of the connector housing 111 as shown in FIG. 15. The terminal 113 has two upright walls 113*a* which are formed with apertures 113*b* where the soldering materials 28 are located so that the melted covering portion 29 of the covered wires 19 is relieved as shown in FIGS. 10, 12 and 15.

Figure 13:
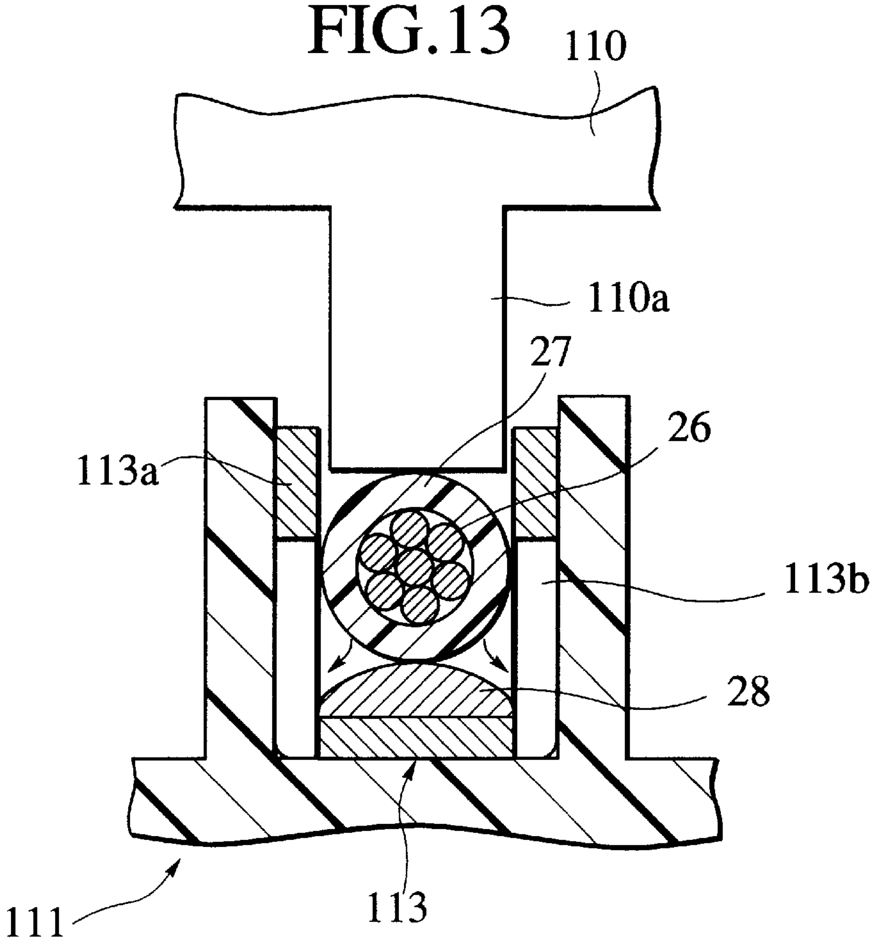
FIG. 13 is a sectional view of the ultrasonic horn, the terminal and the covered wire, and showing the specific arrangement thereof.
Figure 14:
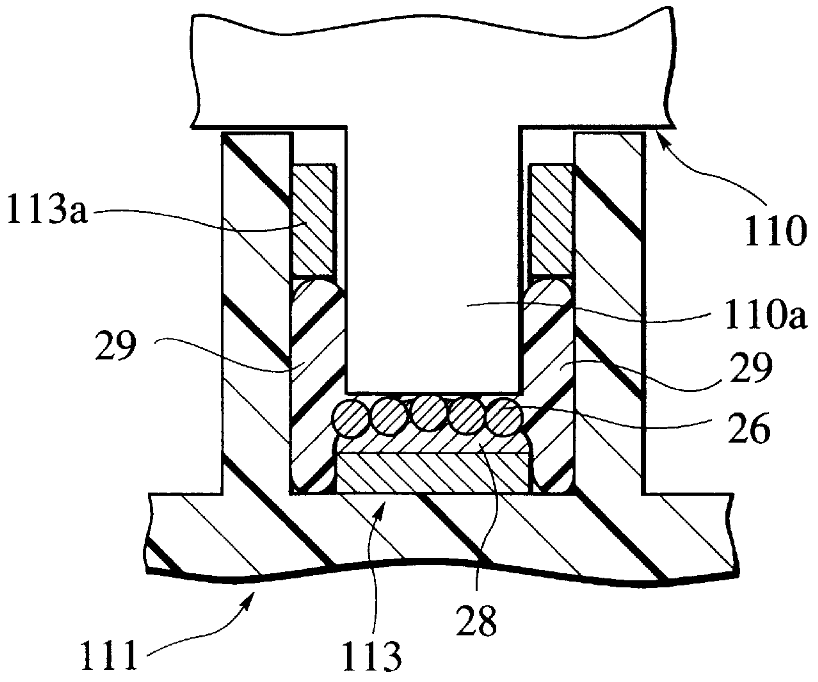
FIG. 14 is a sectional view of the connection structure where the melted covering portion of the covered wire is relieved into an aperture formed in the terminal.
Figure 16:
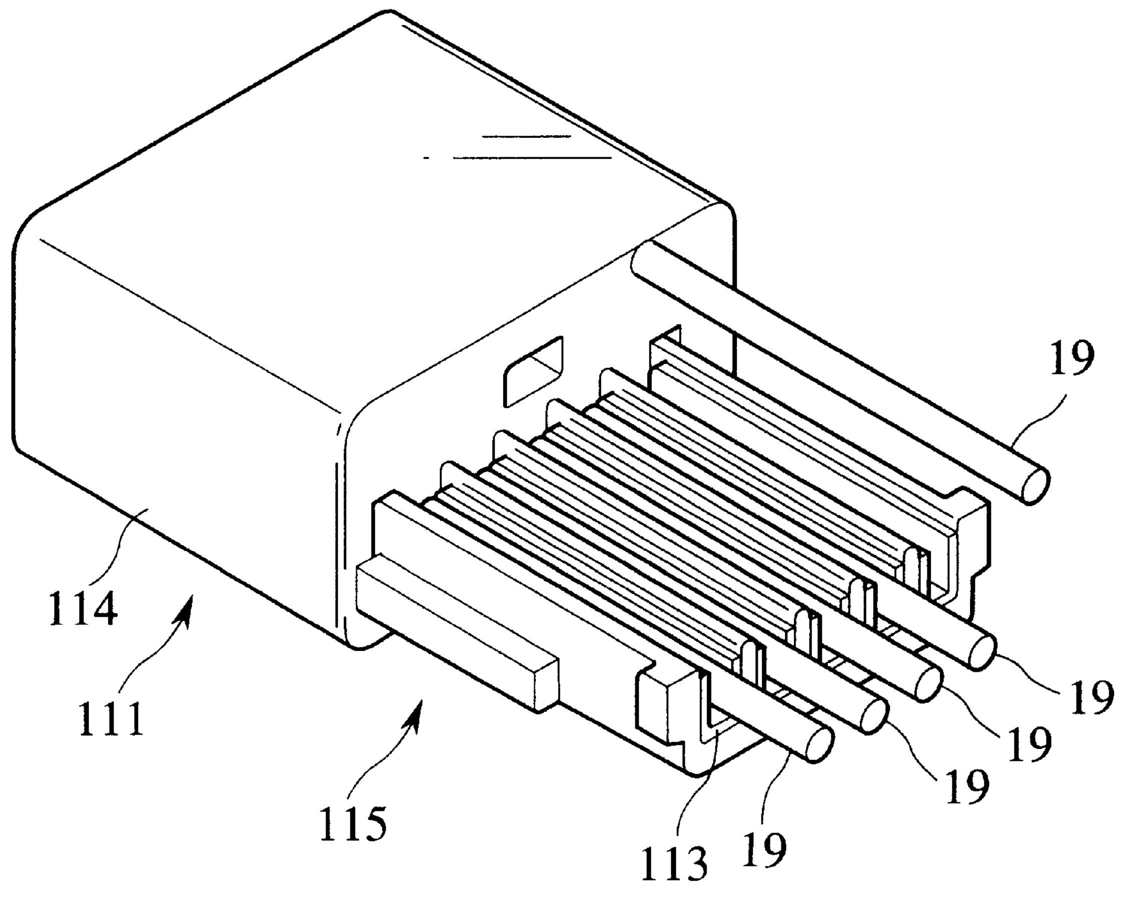
FIG. 16 is a perspective view which shows a second stage of the connection method of the second embodiment of the present invention.
Figure 17:
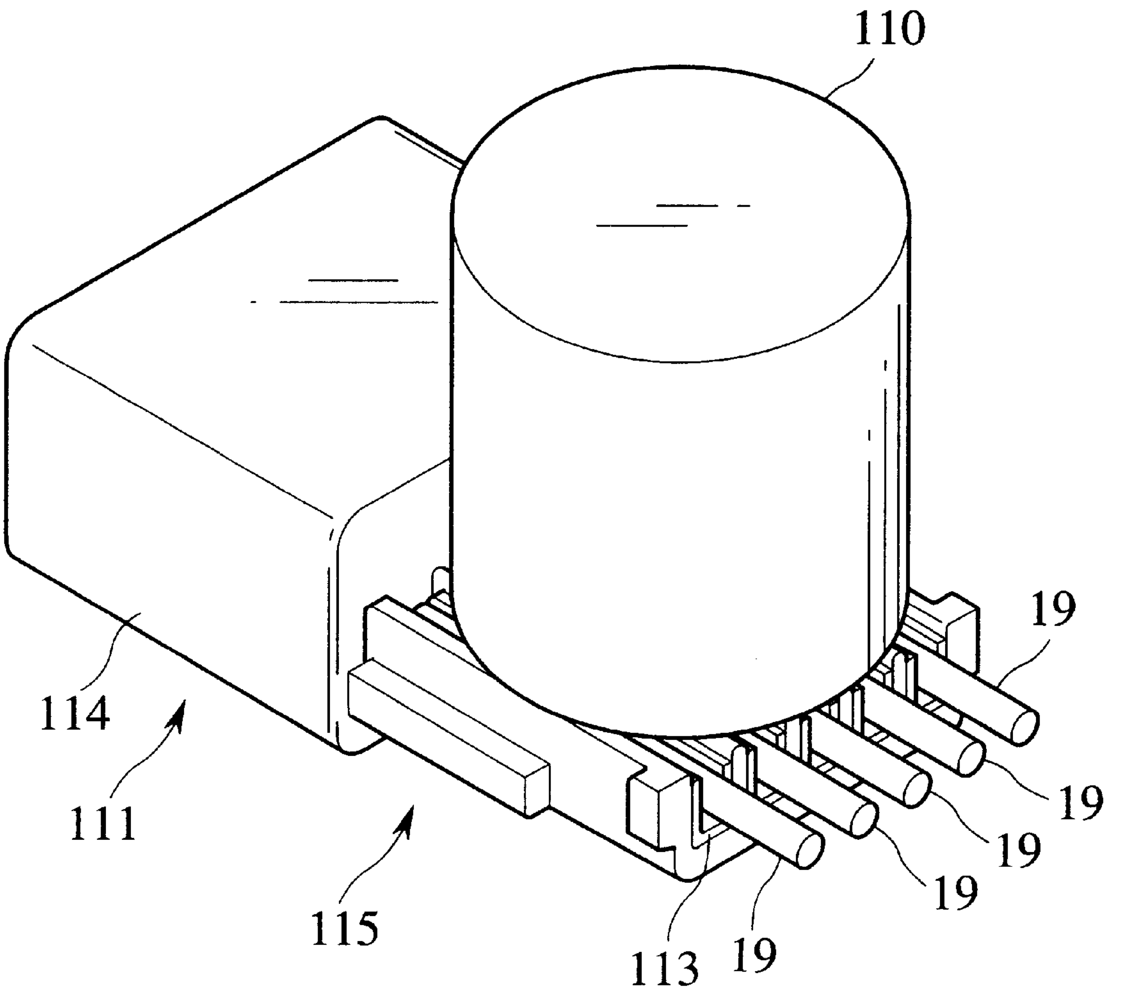
FIG. 17 is a perspective view which shows an ultrasonic vibration performing stage of the connection method of the second embodiment of the present invention.

Next, the covered wires 19 are put on the terminals 113 as shown in FIG. 16. After that, the ultrasonic horn 110 is put and pressed on the covered wires 19 in a manner such that the plurality of protrusions 110*a* contact to the covered wires 19 as shown in FIG. 17, then applying and performing the ultrasonic vibration. By applying the ultrasonic vibration by ultrasonic horn 110, the covering portion 27 of the covered wires 19 is melted and removed from the covered wires 19, so that the melted covering portion 29 of the covered wires 19 is relieved to the apertures 113*b*, as shown in FIGS. 13, and 14. In this stage, the soldering materials 28 are melted and the stripped cores 26 are pressed against the melted soldering materials 28 so that the surfaces of the soldering materials 28 are formed with concave portions which are depending and according to contours of the stripped cores 26 as shown in FIGS. 12 and 14. Therefore, the contact area between the stripped cores 26 and the soldering materials 28 can be increased, thereby reducing the contact resistance therebetween for the electrical current.

Figure 12:
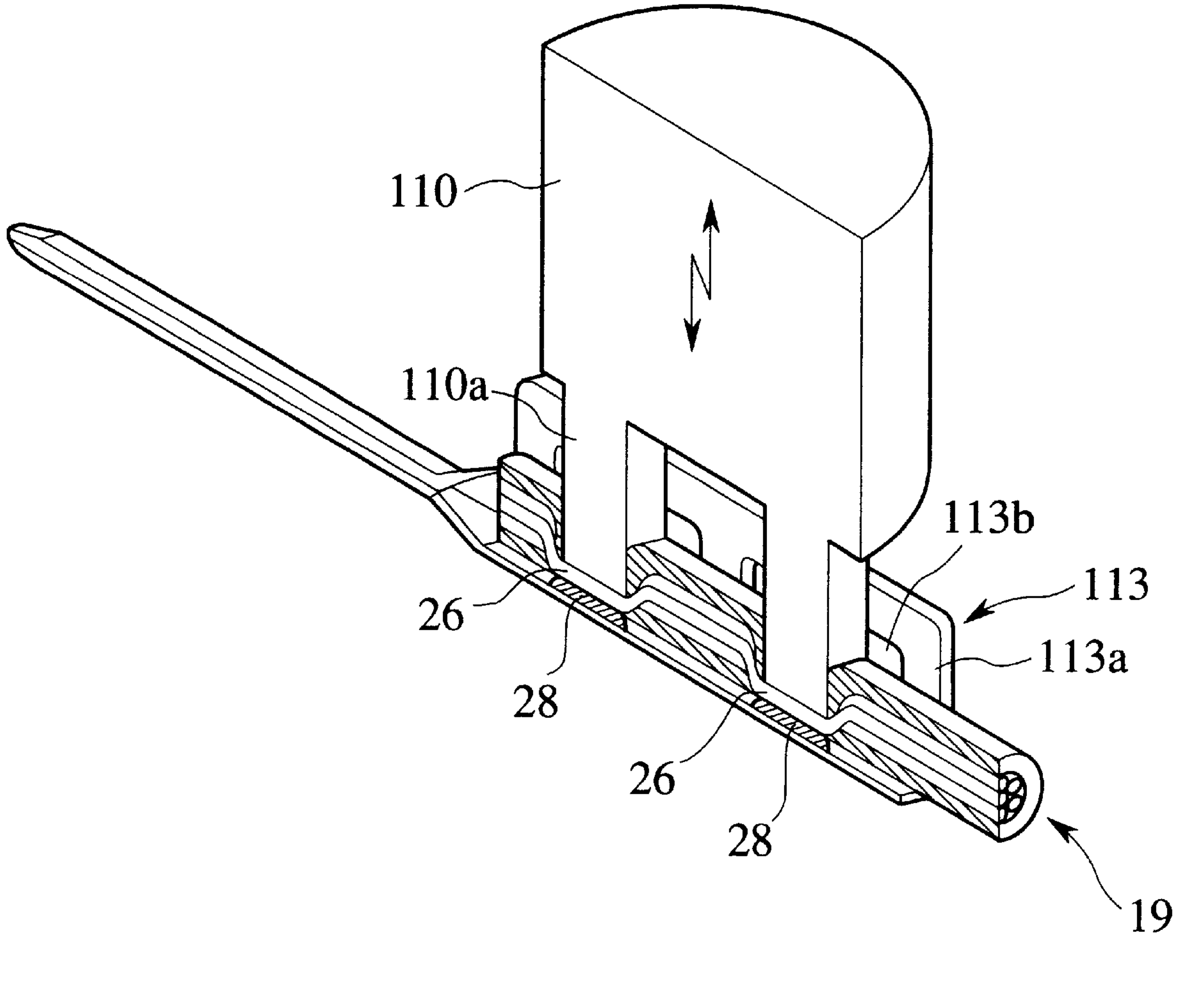
FIG. 12 is a perspective sectional view of the ultrasonic horn, the terminal and the covered wire according to a second embodiment of the present invention, and showing the stage where the covering portion of the covered wire is melted.
Figure 18:
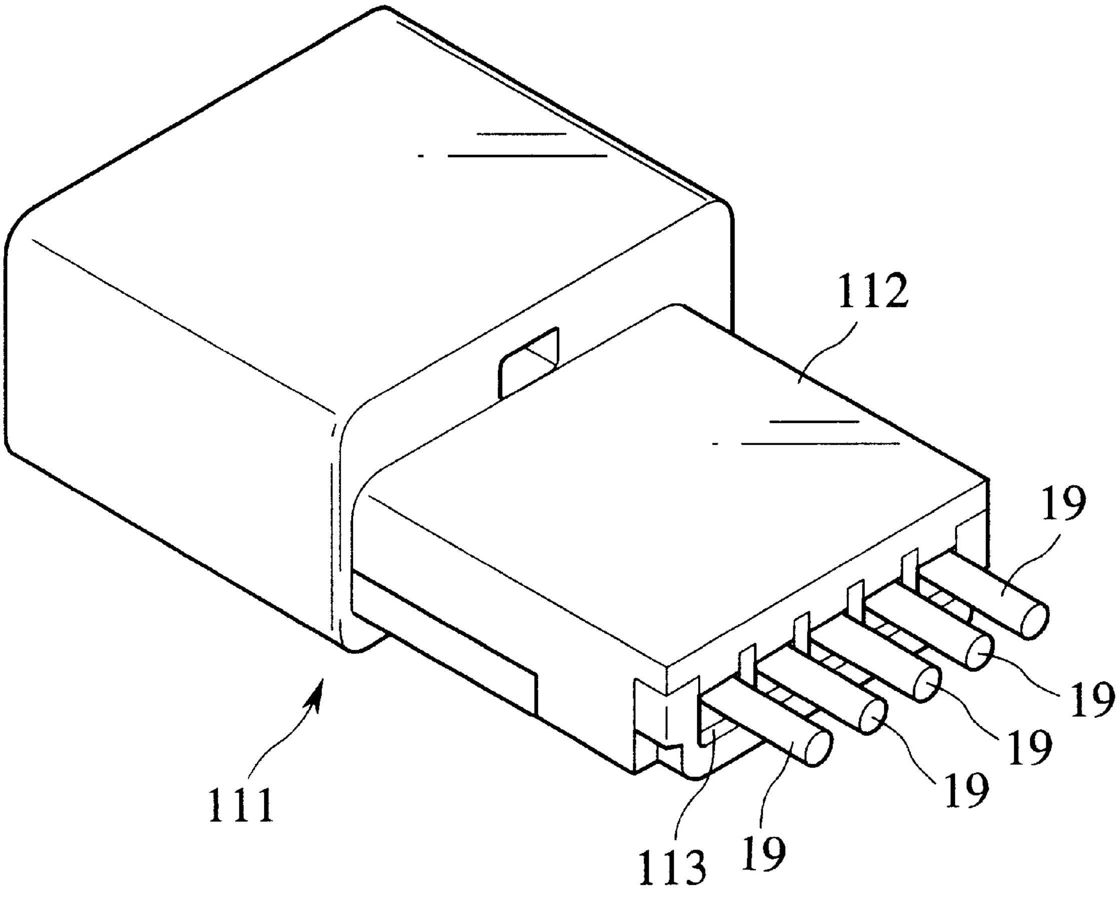
FIG. 18 is a perspective view of a connector where the connector housing is covered with the cover by the connection method of the second embodiment of the present invention.

As the next stage, after removing the ultrasonic horn 110 from the partially melted covered wires 19, a cover 112 is fitted to the connector housing 111 as shown in FIG. 18, in such a manner that protrusions 112*a* protruding from the bottom surface of the cover 112 are inserted into the holes shown in FIG. 12 formed in the covering portion 27 by the ultrasonic horn 110.

In the embodiment, the number of the grooves 18 of the connector housing 111 is five(5), and the number of the soldering materials 28 of the terminal 113 is two(2). The number of the protrusions 110*a* is ten(10=5×2). Furthermore, the cover 112 is formed with the ten(10) protrusions 112*a* protruding from the bottom surface thereof in such a manner that the location, arrangement and numbers are corresponding to the location, arrangement and numbers of the protrusions 110*a* of the ultrasonic horn 110.

Therefore, the covered wires 19 are kept to be firmed in the connector housing 111 even when the covered wires 19 are pulled by an outer force which is not intended. Furthermore, depending on the two soldering materials 28 for one terminal 113, the covered wire 19 is stabilized and the cores 26 can avoid from being broken by the Bauschinger effect.

Designing the outer size of the terminal 113 to fit into the inner size of the groove 18, the terminal 113 is stabilized in the groove 18. Therefore, productivity of the connection structure can be improved and facilitated.

According to the state where the cover 112 is fitted to the connector housing 111, the ten(10) protrusions protruding from the bottom surface of the cover 112 are kept to push and to press the stripped cores 26 against the terminal 113 to electrically contact each other.

While preferred embodiments of the present invention have been described using specific terms, such description is for illustrative purposes, and it is to be understood that changes and variations may be made without departing from the spirit or scope of the following claims.

What is claimed is:

1. A connection method for a wire and a terminal, comprising the steps of:

incorporating a terminal in a groove formed on a first resin member, the terminal provided with a conductive soldering material at the surface thereof;

putting a wire which includes cores covered with a covering portion made of resin on the terminal;

inserting a protrusion formed on a second resin member into the groove in such a manner that the protrusion and the groove pinch the terminal and the wire;

by performing ultrasonic vibration while applying a pressure to the covered wire and the terminal so as to melt and remove the covering portion; and making the cores into contact with the soldering material being at least softening state.

2. The connection method for a wire and a terminal according to claim 1, wherein the soldering material is softened by heat generated when the covering portion is melted and removed by the ultrasonic vibration.

3. A connection method for a wire and a terminal, comprising the steps of:

incorporating a terminal in a groove formed on a first resin member, the terminal provided with a conductive soldering material at the surface thereof;

putting a wire which includes cores covered with a covering portion made of resin on the terminal;

inserting an ultrasonic horn into the groove in such a manner that the ultrasonic horn and the groove pinch the terminal and the wire;

by performing ultrasonic vibration from the ultrasonic horn while applying a pressure to the covered wire and the terminal so as to melt and remove the covering portion;

making the cores into contact with the soldering material being at least softening state; and inserting a protrusion formed on a second resin member into the groove in such a manner that the protrusion and the groove pinch the terminal and the wire.

4. The connection method for a wire and a terminal according to claim 3, wherein the soldering material is softened by heat generated when the covering portion is melted and removed by the ultrasonic vibration.

* * * * *